US011086199B2

(12) United States Patent
Shum

(10) Patent No.: US 11,086,199 B2
(45) Date of Patent: Aug. 10, 2021

(54) STROBE DEVICE

(71) Applicants: Nissin Industries Ltd., Hong Kong (CN); Chikara Goto, Tokyo (JP)

(72) Inventor: Tak Wah Shum, Hong Kong (CN)

(73) Assignees: Nissin Industries Ltd., Hong Kong (CN); Chikara Goto, Tokyo (JP)

( * ) Notice: Subject to any disclaimer, the term of this patent is extended or adjusted under 35 U.S.C. 154(b) by 504 days.

(21) Appl. No.: 16/087,147

(22) PCT Filed: Jun. 19, 2017

(86) PCT No.: PCT/JP2017/022572
§ 371 (c)(1),
(2) Date: Sep. 21, 2018

(87) PCT Pub. No.: WO2018/235140
PCT Pub. Date: Dec. 27, 2018

(65) Prior Publication Data
US 2021/0181599 A1    Jun. 17, 2021

(51) Int. Cl.
*G03B 15/05*      (2021.01)
*G03B 17/12*      (2021.01)

(52) U.S. Cl.
CPC .............. *G03B 15/05* (2013.01); *G03B 17/12* (2013.01); *G03B 2217/244* (2013.01)

(58) Field of Classification Search
None
See application file for complete search history.

(56) References Cited

U.S. PATENT DOCUMENTS

| 4,423,940 | A | * | 1/1984 | Kashihara | G03B 15/05 |
|---|---|---|---|---|---|
| | | | | | 396/62 |
| 4,462,666 | A | * | 7/1984 | Orban | G03B 15/05 |
| | | | | | 396/201 |
| 2005/0286352 | A1 | | 12/2005 | Inui | |

(Continued)

FOREIGN PATENT DOCUMENTS

| JP | S5223539 | 2/1977 |
|---|---|---|
| JP | S58141226 | 9/1983 |

(Continued)

OTHER PUBLICATIONS

International Search Report for PCT/JP2017/022572 dated Sep. 5, 2017, 3 pages.

(Continued)

*Primary Examiner* — William B Perkey
(74) *Attorney, Agent, or Firm* — Dority & Manning, P.A.

(57) ABSTRACT

In an electrically-operated zooming strobe device of a lens moving type, to prevent damage to the zooming drive device even if an external force acts on the lens holder in the front-rear direction, a lens holder (26) having a lens (68) on a front side thereof is mounted on a strobe main body 24 having light emitting part (36) such that the lens holder is movable in the front-rear direction, and the strobe main body (24) is provided with a zooming drive device (47) including a movable member (44) driven by an electric motor (48) in the front-rear direction, wherein the movable member (44) and the lens holder (26) are connected to each other by a magnetic force of magnet pieces (62, 78) attached to the movable member (44) and the lens holder (26).

8 Claims, 7 Drawing Sheets

(56) References Cited

U.S. PATENT DOCUMENTS

| | | |
|---|---|---|
| 2013/0163257 A1 | 6/2013 | Shum |
| 2013/0176482 A1 | 7/2013 | Hirasawa et al. |
| 2015/0212392 A1 | 7/2015 | Man |

FOREIGN PATENT DOCUMENTS

| | | |
|---|---|---|
| JP | S6037538 | 2/1985 |
| JP | H0219122 | 2/1990 |
| JP | H11142926 | 5/1999 |
| JP | 2003195263 | 7/2003 |
| JP | 2003280072 | 10/2003 |
| JP | 200405212 | 2/2004 |
| JP | 2007199167 | 8/2007 |
| JP | 2010181553 | 8/2010 |
| JP | 2012063660 | 3/2012 |
| JP | 2012134833 | 7/2012 |
| JP | 2013134323 | 7/2013 |
| JP | 2013164559 | 8/2013 |
| JP | 2015141381 | 8/2015 |

OTHER PUBLICATIONS

Chinese Office Action for CN201780016480.2 dated Jun. 29, 2020, 6 pages.

International Search Report for PCT/JP2017/022572 dated Sep. 5, 2017, 10 pages.

\* cited by examiner

STROBE DEVICE

CROSS REFERENCE TO RELATED APPLICATIONS

This application is the U.S. National Stage entry of International Application Number PCT/JP2017/022572 filed under the Patent Cooperation Treaty having a filing date of Jun. 19, 2017, which is incorporated herein by reference.

TECHNICAL FIELD

The present invention relates to a strobe device, and particularly to an electrically-operated zooming strobe device.

BACKGROUND ART

As a strobe device for a camera, there is known a strobe device having an electrically-operated zooming function, including: a main body housing having a Fresnel lens fixedly disposed in a front part thereof; a lamp holder provided in the main body housing so as to be movable in a front-rear direction and holding a light emitting means such as a xenon discharge tube; and a zooming drive device provided in the main body housing and including an electric motor and a feed screw mechanism for driving the lamp holder in the front-rear direction, such that in accordance with movement of the lamp holder in the front-rear direction, the distance between the Fresnel lens and the light emitting means in an optical axis direction (in the front-rear direction), whereby an illumination angle of a strobe light (strobe illumination angle) for an object to be captured by the camera changes (see Patent Documents 1 and 2, for example).

PRIOR ART DOCUMENT(S)

Patent Document(S)

Patent Document 1: JP2012-63660A
Patent Document 2: JP2013-134323A

SUMMARY OF THE INVENTION

Task to be Accomplished by the Invention

In the strobe device in which the lamp holder built in the main body housing undergoes a movement in the main body housing in the front-rear direction (zooming movement) (strobe device of a lamp holder moving type), the lamp holder is not exposed to outside, and therefore, no external force acts on the lamp holder, but the main body housing is required to have a front-rear length greater than a zooming movement length for the movement of the lamp holder. Therefore, the strobe device of a lamp holder moving type is difficult to be made compact, and tends to be cumbersome both when stored and when carried.

With regard to such a problem, in a strobe device in which the lens holder (lens-side housing) having a Fresnel lens attached to a front side thereof is mounted to the strobe main body (main body-side housing) having a light emitting part such that the lens holder is movable in the front-rear direction (strobe device of a lens moving type), the main body-side housing does not have to have a lamp holder movement space with a front-rear length greater than the zooming movement length. In a state where the lens-side housing is at a position receded with respect to the main body-side housing (wide position), the strobe device of a lens moving type becomes compact compared to a strobe device of a lamp holder moving type, and is prevented from being cumbersome when stored and when carried.

In the strobe device of a lens moving type, the lens holder is exposed to outside, and therefore, an external force may act on the lens holder. In a strobe device in which the zooming movement of the lens holder is performed manually, even if an external force acts on the lens holder, it only causes the lens holder to move but does not impart damage to a guiding part for the zooming movement or the like. However, in an electrically operated type in which the zooming movement of the lens holder is performed by an electric motor, the lens holder is connected to the electric motor rigidly via a drive mechanism, and therefore, if an external force acts on the lens holder in the front-rear direction, a load acts on the zooming drive device including the drive mechanism and the electric motor, and may cause damage to the zooming drive device.

A task to be accomplished by the present invention is, in an electrically-operated zooming strobe device of a lens moving type, to prevent damage to the zooming drive device even if an external force acts on the lens holder in the front-rear direction.

Means to Accomplish the Task

According to one embodiment of the present invention, there is provided a strobe device (20) comprising a strobe main body (24) having a light emitting part (36), and a lens holder (26) mounted on the strobe main body (24) so as to be movable in a front-rear direction and having a lens (68) on a front side thereof, characterized in that the strobe device comprises: a zooming drive device (47) provided in the strobe main body (24) and including an electric motor (48) and a movable member (44) driven by the electric motor (48) in the front-rear direction; and a magnet piece(s) (62, 78) attached to at least one of the movable member (44) and the lens holder (26) to connect the movable member (44) and the lens holder (26) to each other by a magnetic force.

According to this arrangement, when a large external force acts on the lens holder (26) in the front-rear direction, the connection between the movable member (44) and the lens holder (26) by the magnetic force of the magnet piece is released, and hence, the movable member (44) and the lens holder (26) are separated from each other. Therefore, no large external force will act on the zooming drive device (47), and damage to the zooming drive device (47) can be prevented.

In the above strobe device, preferably, the strobe main body (24) includes a main body-side housing (30) accommodating the light emitting part (36) and the zooming drive device (47) therein, the lens holder (26) includes a lens-side housing (66) engaging an outer circumference of the main body-side housing (30) so as to be movable in the front-rear direction and supporting the lens (68), and the magnet piece(s) includes a movable member-side magnet piece (62) provided on the movable member (44) and located in the main body-side housing (30), the movable member-side magnet piece (62) opposing a magnetic attraction part (78) provided to the lens-side housing (66) via the main body-side housing (30).

According to this arrangement, the movable member-side magnet piece (62) is not exposed to outside of the main body-side housing (30), resulting in improved design.

In the above strobe device, preferably, the movable member-side magnet piece (62) is provided on an outer circumferential surface of the movable member (44), the lens holder (26) includes a lens-side housing (66) engaging an outer circumference of the main body-side housing (30) so as to be movable in the front-rear direction, and the magnetic attraction part includes a lens-side magnet piece (78) provided on an inner surface of the lens-side housing (66) opposing the movable member-side magnet piece (62).

According to this arrangement, because the movable member (44) and the lens holder (26) are connected to each other by the magnetic attraction between the magnet pieces, a desired magnetic attraction force is obtained without increasing the size of the movable member-side magnet piece (62) and the lens-side magnet piece (78).

In the above strobe device, preferably, the strobe main body (24) includes a pair of left and right linear guide members (42) each extending in the front-rear direction in the main body-side housing (30) to guide movement of the movable member (44) in the front-rear direction, the movable member-side magnet piece (62) includes two magnet pieces provided on left and right parts of the movable member (44) respectively aligned with lateral positions of engagement portions (46) at which the movable member engages the linear guide members (42).

According to this arrangement, the movement of the movable member (44) in the front-rear direction can be performed in a stable manner without causing skew, and in addition, when the movable member (44) undergoes movement in the front-rear direction, the movable member-side magnet piece (62) is prevented from undergoing an "uneven movement."

In the above strobe device, preferably, the zooming drive device (47) includes a drive arm (54) having a base end (54A) fixed to an output portion of the electric motor, and a connecting link (56) having one end (56A) pivotably connected to a free end (54B) of the drive arm (54) and another end (56B) pivotably connected to a laterally central part of the movable member (44).

According to this arrangement, the structure can be simplified compared to a case where a feed screw mechanism is used.

In the above strobe device, preferably, the strobe device further comprises: a connecting state detector (64) configured to detect whether the movable member (44) and the lens holder (26) are connected to each other by the magnetic force of the magnet piece(s) (78) by detecting magnetism of the magnet piece(s) (78); and a warning device (112) configured to make a warning when the connecting state detector (64) detects that the movable member and the lens holder are not connected to each other.

According to this arrangement, it is possible to properly notify the user of poor assembly of the lens holder (26) to the main body-side housing (30).

In the above strobe device, preferably, the strobe device further comprises: a connecting state detector (64) configured to detect whether the movable member (44) and the lens holder (26) are connected to each other by the magnetic force of the magnet piece(s) (78) by detecting magnetism of the magnet piece(s) (78); and a default controller (104) configured to control driving of the electric motor (48) to move the movable member (44) to a preset default position when the connecting state detector (64) detects that the movable member and the lens holder are not connected to each other.

According to this arrangement, when the assembly of the lens holder (26) to the main body-side housing (30) is poor, the movable member (44) is returned to the preset default position, whereby initialization for remounting the lens holder (26) to the main body-side housing (30) can be performed properly.

In the above strobe device, preferably, the lens (68) consists of a Fresnel lens (68) made of plastic.

According to this arrangement, a sharp lens shape can be obtained more easily in a molded Fresnel lens compared to when the lens is made of quartz glass, so that excellent lens property can be obtained.

Effect of the Invention

According to the strobe device of the present invention, in an electrically-operated zooming strobe device of a lens moving type, damage to the zooming drive device can be prevented even if an external force acts on the lens holder in the front-rear direction.

DESCRIPTION OF THE PREFERRED EMBODIMENT(S)

In the following, an embodiment of a strobe device according to the present invention will be described with reference to FIGS. 1 to 7.

Figure 1:
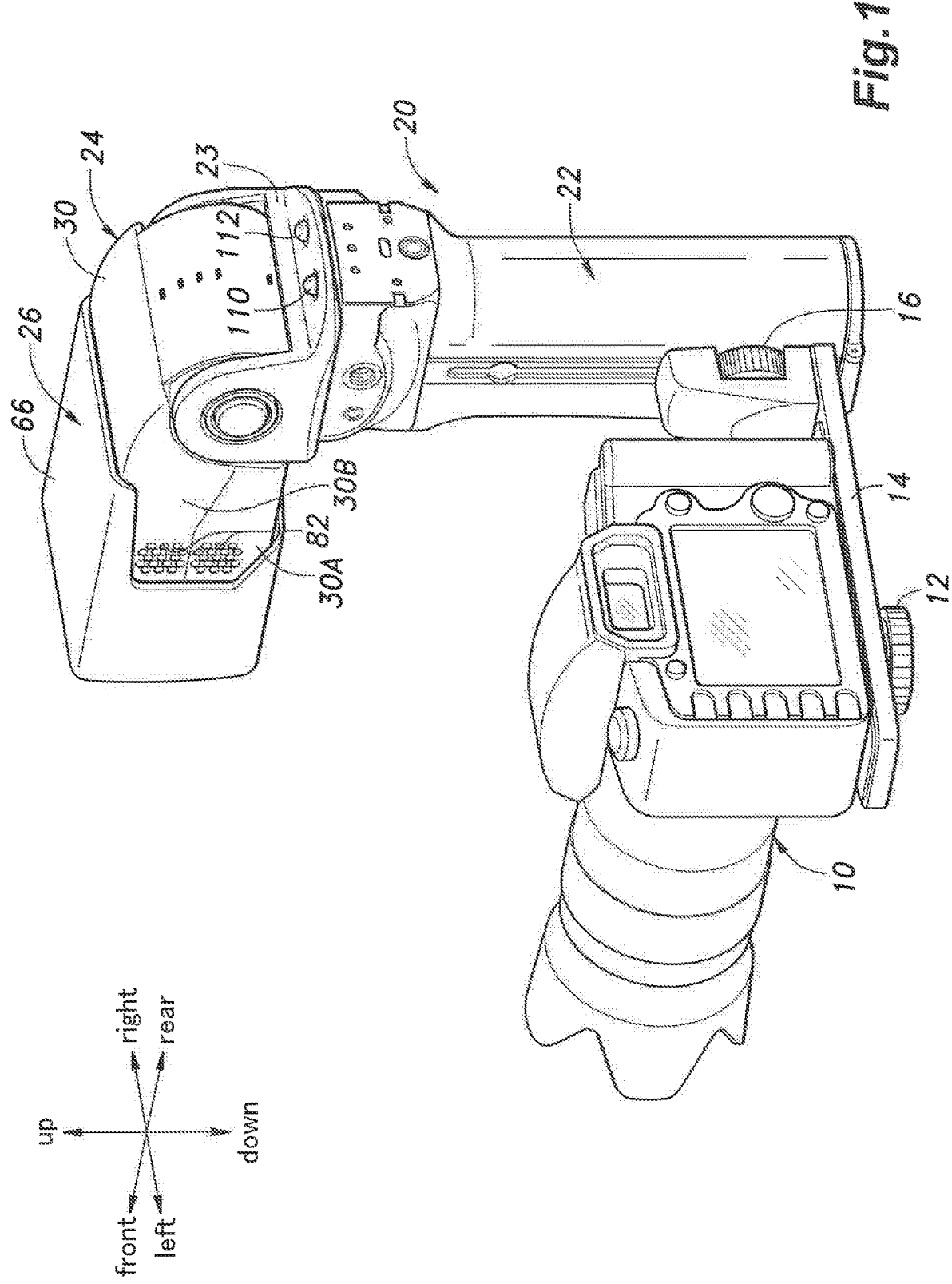
FIG. 1 is a perspective view of one embodiment of a strobe device according to the present invention and a camera as viewed from the rear.

As shown in FIG. 1, a strobe bracket 14 is attached to a bottom of a camera by means of a screw 12. A strobe device 20 is attached to an end of the strobe bracket 14 by means of a fixture 16.

Figure 2:
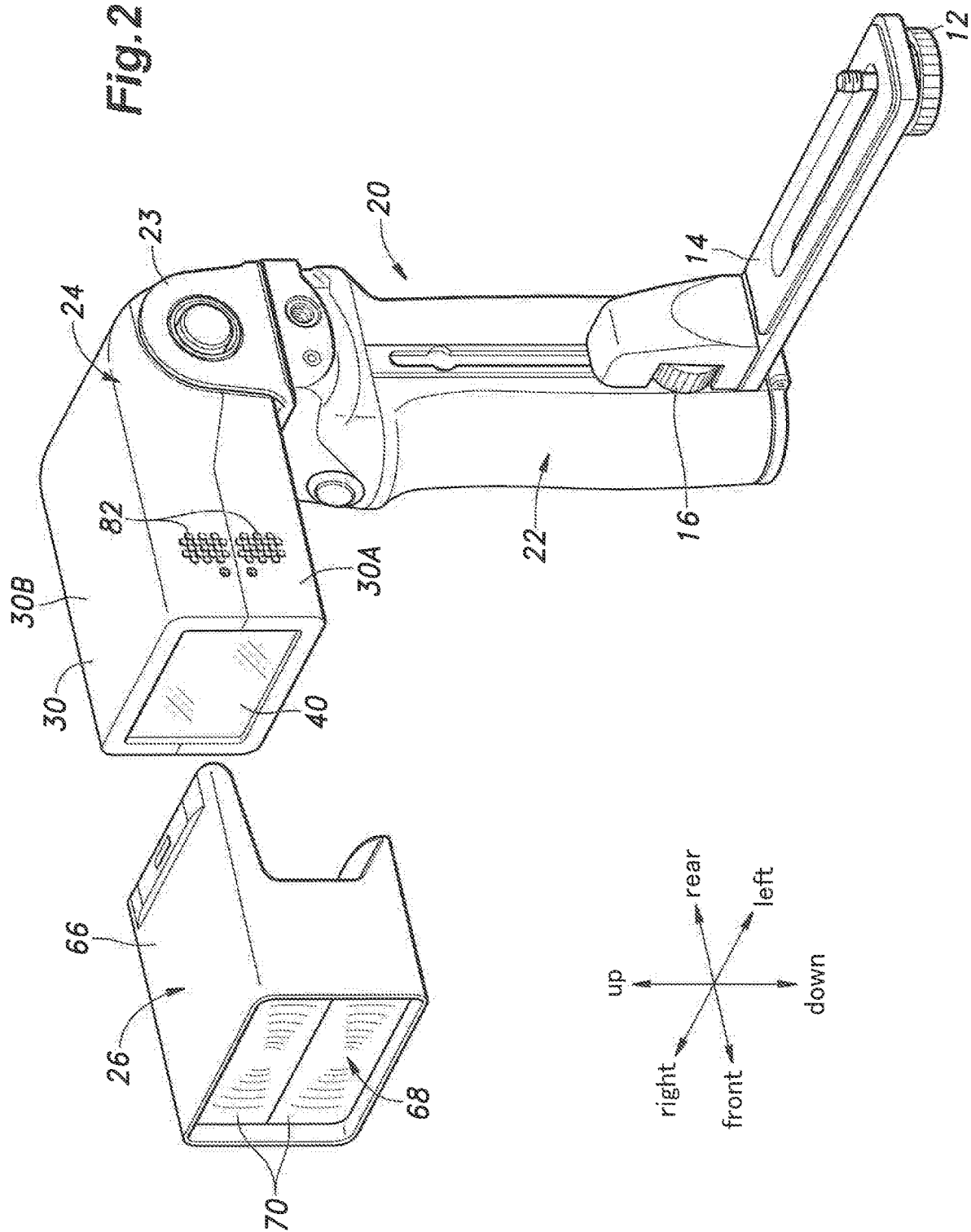
FIG. 2 is an exploded perspective view of the strobe device of the embodiment as viewed from the front.
Figure 3:
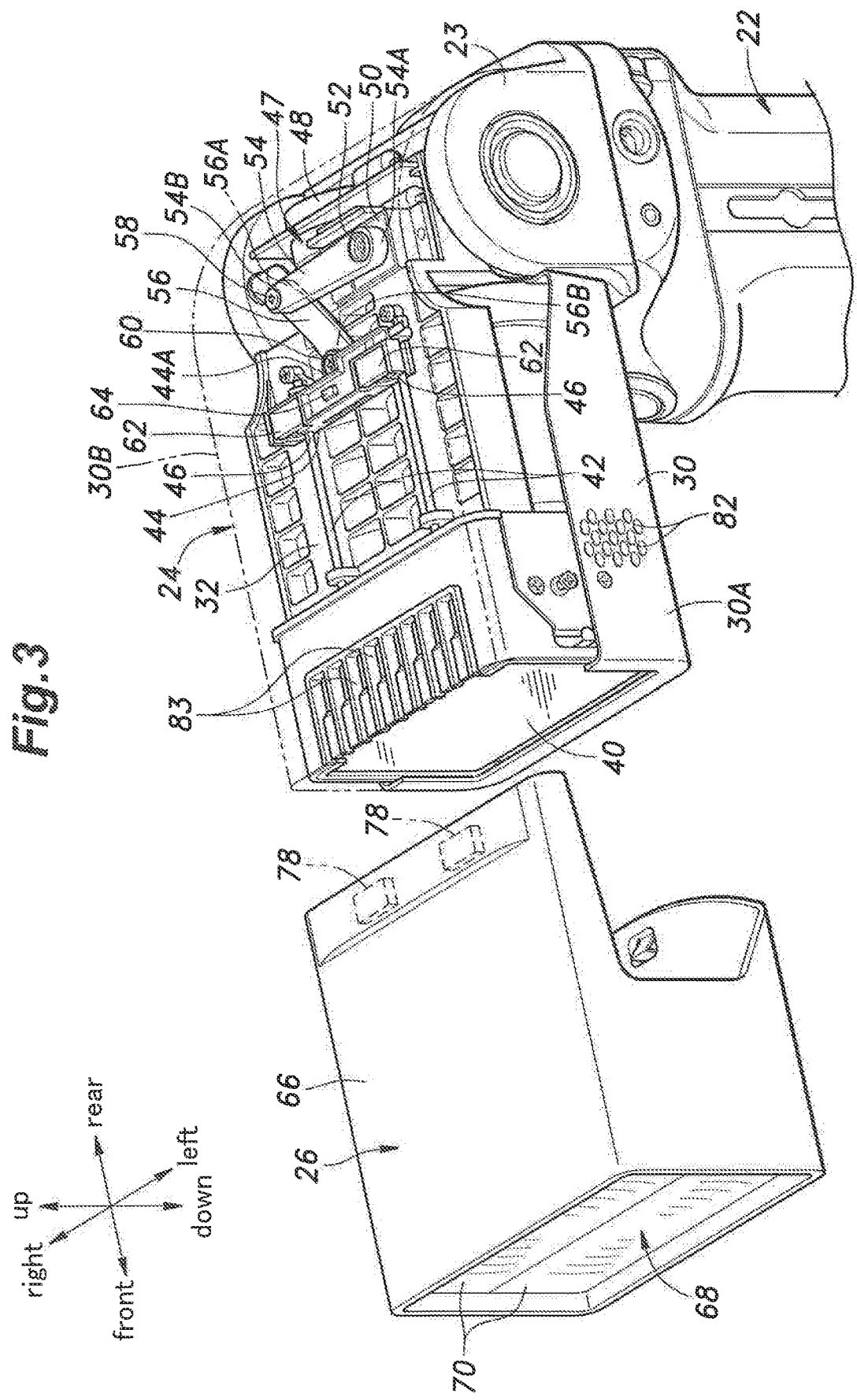
FIG. 3 is an exploded perspective view showing a main body-side housing of the strobe device of the embodiment, with a part thereof being removed.

As shown in FIGS. 1 to 3, the strobe device 20 includes a vertically elongated battery case 22, a strobe main body 24 tiltably mounted on a mounting portion 23 provided in an upper part of the battery case 22, and a lens holder 26 mounted on a front part of the strobe main body 24 so as to be movable in a front-rear direction. The mounting portion 23 is provided with a normal lamp 110 consisting of a blue LED and an abnormal lamp 112 consisting of a red LED.

Figure 4:
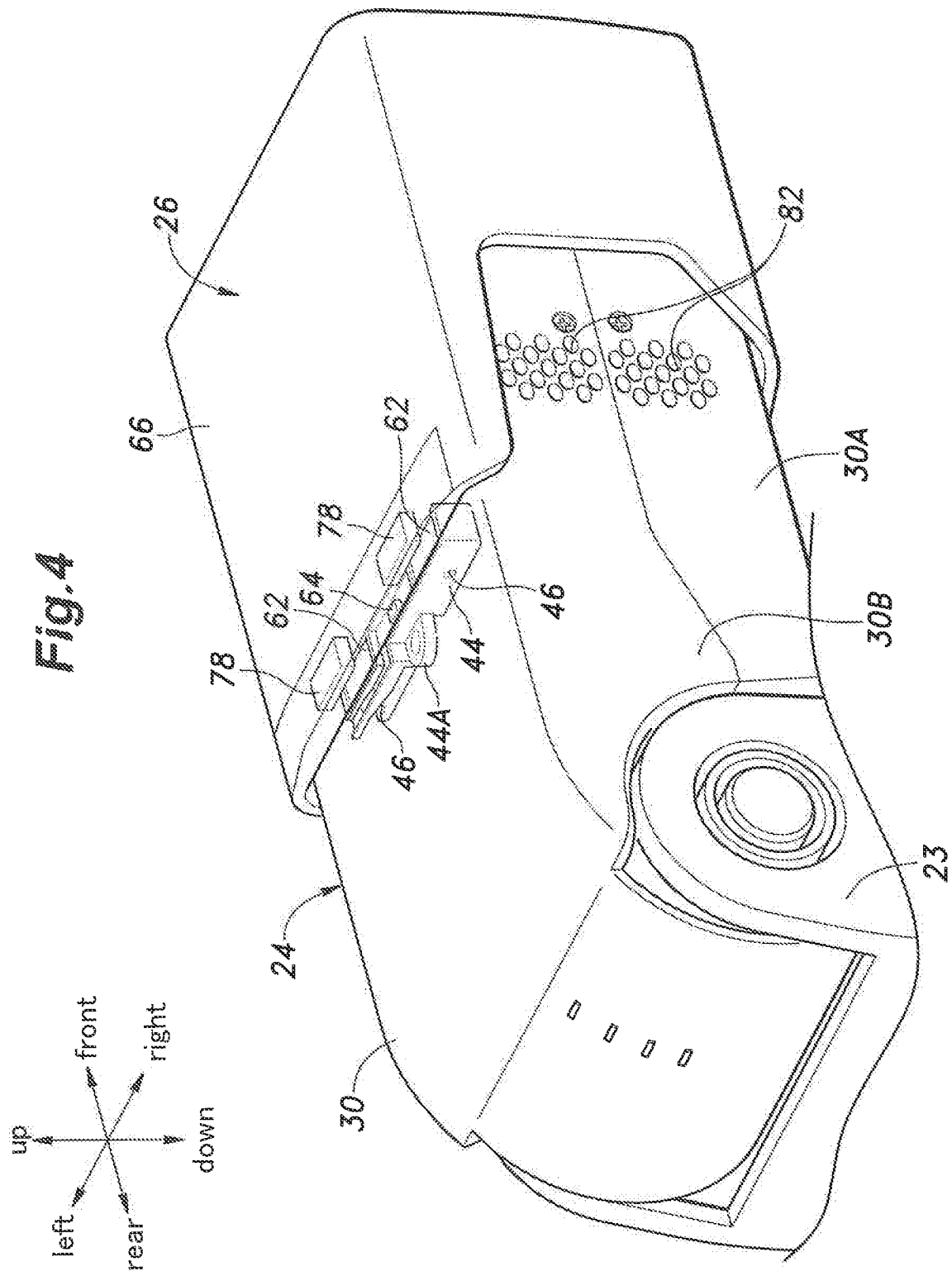
FIG. 4 is a perspective view of the strobe device of the embodiment, with an important part thereof being shown through another part.
Figure 5:
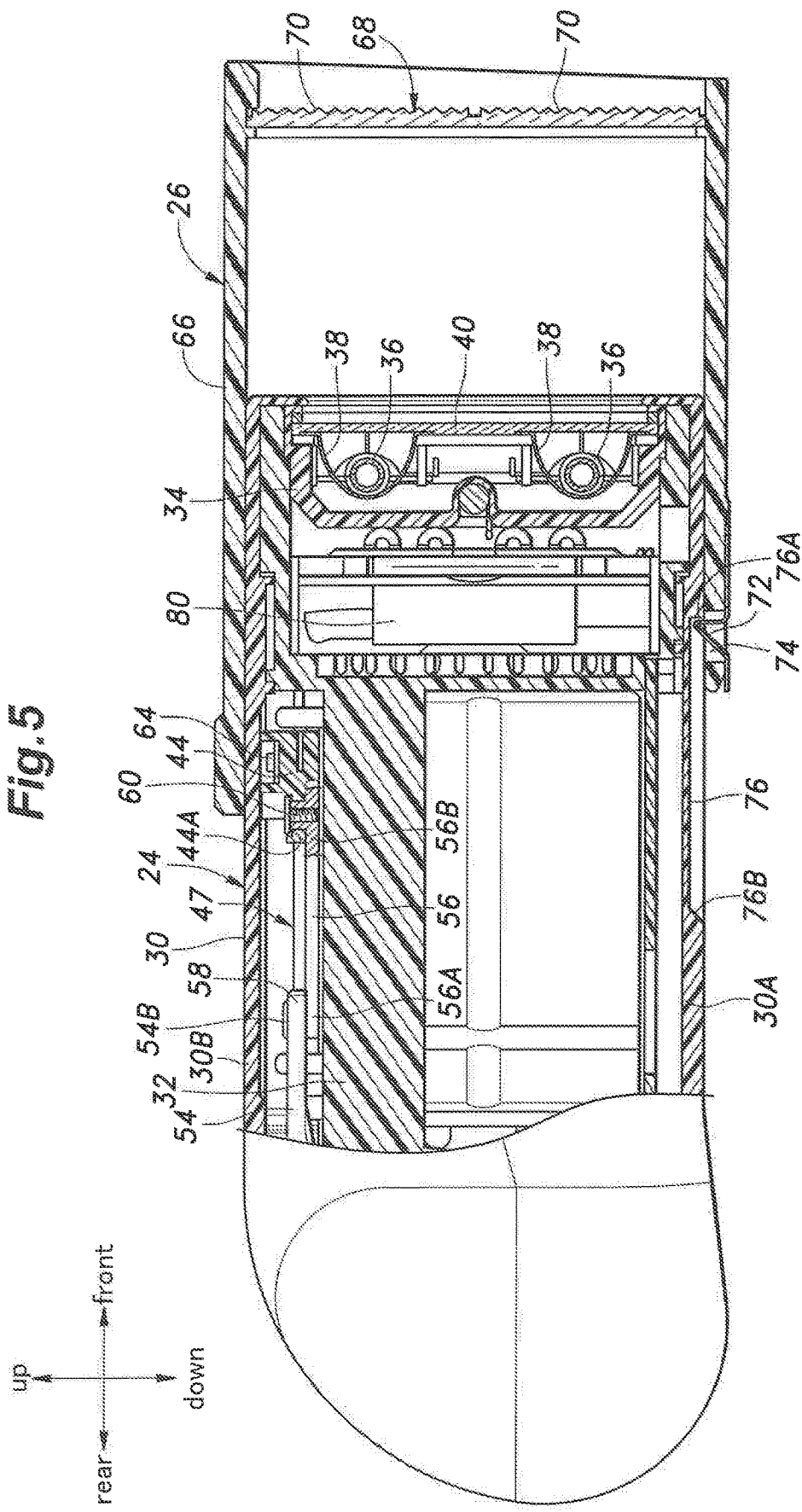
FIG. 5 is a side view of the strobe device of the embodiment, with an important part thereof being shown in cross section.

As shown in FIGS. 1 to 5, the strobe main body 24 includes a main body-side housing (outer shell) 30 which is a substantially rectangular cylindrical body having a front opening and constituted by assembling a lower housing 30A and an upper housing 30B. As shown in FIG. 5, an internal support 32 is fixed in the main body-side housing 30. A lamp housing 34 having a front opening is attached to a front part of the internal support 32. The lamp housing 34 supports two pairs of a xenon discharge tube 36 and a reflecting mirror 38 that form two light emitting parts arranged vertically one over the other. A protective glass 40 made of heat-resistant glass or the like is attached to the lamp housing 34 so as to close the front opening. Though not shown in the drawings, an electric apparatus including a capacitor, a booster circuit, a trigger circuit, etc. for flashing the xenon discharge tubes 36 is attached to the internal support 32.

As shown in FIG. 3, a pair of left and right guide bars (linear guide member) 42 extending in the front-rear direction are attached to an upper part of the internal support 32 located in the main body-side housing 30. The pair of guide bars 42 are engaged with a rectangular movable member 44 extending in a lateral direction to bridge the pair of guide bars 42 such that the movable member 44 is slidable in a direction of extension of the guide bars 42, namely, in the front-rear direction. More specifically, the movable member 44 is formed to have engagement holes 46 in parts thereof near left and right ends as through-holes extending in the front-rear direction, and the guide bars 42 are passed through the corresponding engagement holes 46 in a relatively slidable manner, whereby the movable member 44 undergoes translational movement in the front-rear direction by being guided by the pair of guide bars 42. Thereby, the movement of the movable member in the front-rear direction can be performed in a stable manner without causing skew.

A zooming motor (electric motor) 48 and a speed reducer 50 are mounted on the rear part of the internal support 32, and an output shaft 52 of the speed reducer 50 forms an output portion of the zooming motor 48 rotating about a vertically extending axis (vertical axis). The output shaft 52 is secured to a base end 54A of a drive arm 54. A free end 54B of the drive arm 54 is connected to one end 56A of a connecting link 56 by means of a connecting screw 58 so as to be pivotable (rotatable) about a vertical axis. The other end 56B of the connecting link 56 is connected to a bracket 44A formed in a laterally central part of the movable member 44 by means of a connecting screw 60 so as to be pivotable (rotatable) about a vertical axis.

In this way, an electrically operated zooming drive device 47 including the movable member 44, the zooming motor 48, the speed reducer 50, the drive arm 54, and the connecting link 56 is configured. The mechanism including the drive arm 54 and the connecting link 56 is advantageous compared to a mechanism of a feed screw type as it is simpler in structure and occupies a smaller space. Thereby, the strobe device 20 can be made compact.

To left and right parts of an upper surface of the movable member 44 aligned with the lateral positions of the respective engagement holes 46 are fixed a pair of movable member-side magnet pieces 62 each having a rectangular plate-like shape. In this arrangement, when the movable member 44 is moved in the front-rear direction, the movable member-side magnet pieces 62 are prevented from undergoing an "uneven movement," and a later-described magnetic coupling between the movable member-side magnet pieces 62 and lens-side magnet pieces 78 becomes stable even during the movement of the movable member 44 in the front-rear direction.

The movable member 44 has a magnetic sensor 64 consisting of a Hall element or the like and attached to a laterally central part of an upper surface thereof. The magnetic sensor 64 is configured to respond to magnetism of later-described lens-side magnet pieces 78 provided to the lens holder 26 to detect magnetism of the lens-side magnet pieces 78.

As shown in FIGS. 1 to 5, the lens holder 26 includes a lens-side housing 66 having a rectangular tubular shape with two open ends, such that the lens-side housing 66 is engaged with an outer circumference of the main body-side housing 30 to be movable in the front-rear direction. A Fresnel lens 68 having a rectangular plate-like shape is attached to a front part the lens-side housing 66. The Fresnel lens 68 is made of plastic such as acrylic resin, namely, is a resin molded part, and has two lens parts 70 arranged vertically one over the other to respectively correspond to the two xenon discharge tubes 36 arranged vertically one over the other.

With regard to the Fresnel lens 68 implemented as a resin molded part, because the Fresnel lens 68 is attached to the lens-side housing 66 having a tubular open structure, instead of to the lamp housing 34, and thus, is placed in an environment exposed to an outer air, a temperature rise of the Fresnel lens 68 due to flashing of the xenon discharge tubes 36 is suppressed, and this alleviates the temperature environment.

Owing to this arrangement, the Fresnel lens 68 is allowed to be made by resin molding. The Fresnel lens 68 formed as a resin molded part makes it easier to obtain a sharp lens shape compared to a lens made of molding quartz glass, whereby an excellent lens property with a small optical loss and a high light transmittance is obtained. Thereby, a large amount of light can be obtained without increasing the amount of emitted light.

As shown in FIG. 5, an engagement member 72 consisting of a leaf spring is attached to a bottom of the lens-side housing 66. The engagement member 72 includes a part projecting upward triangularly into an interior of the lens-side housing 66 through an opening 74 formed in the bottom of the lens-side housing 66, and is engaged with a groove 76 formed in the bottom of the main body-side housing 30 to extend in the front-rear direction. By this engagement, unless a large external force that would release the engagement acts on the lens-side housing 66, the range of movement of the lens-side housing 66 in the front-rear direction is restricted between a frontmost position where the engagement member 72 abuts on a front end 76A of the groove 76 and a rearmost position where the engagement member 72 abuts on a rear end 76B of the groove 76.

In the present embodiment, because the lens holder 26 is provided so as to be movable in the front-rear direction relative to the strobe main body 24, the main body-side housing 30 does not require a lamp movement room having a front-rear length greater than the zooming movement length. Therefore, in a state where the lens holder 26 is at a position receded with respect to the strobe main body 24 (wide position), the strobe device 20 becomes compact compared to a strobe device of a lamp holder moving type, and is prevented from being cumbersome when stored and when carried.

To left and right parts of an inner surface of an upper part of the lens-side housing 66 are fixed a pair of lens-side magnet pieces 78 each having a rectangular plate-like shape. Each lens-side magnet piece 78 is disposed at a lateral position same as that of the corresponding one of the left and right movable member-side magnet pieces 62, and as shown in FIG. 4, when the lens-side housing 66 is placed at a prescribed position in the front-rear direction relative to the main body-side housing 30, the lens-side magnet pieces 78 squarely face the corresponding movable member-side magnet pieces 62 via the main body-side housing 30 such that their flat faces oppose each other, and the lens-side magnet pieces 78 and the movable member-side magnet pieces 62 attract each other magnetically. The prescribed position of the lens-side housing 66 in the front-rear direction relative to the main body-side housing 30 is a correct assembly position (regular position) of the lens-side housing 66 relative to the main body-side housing 30 where the desired zooming property is to be obtained.

The SN magnetic poles of the movable member-side magnet pieces 62 and the SN magnetic poles of the lens-side magnet pieces 78 may be located at lateral ends and be reversed laterally relative to each other, or may be located at ends in the front-rear direction and be reversed in the front-rear direction relative to each other, and they provide positioning effect in the front-rear direction owing to the mutual magnetic attraction.

Thereby, the lens-side housing 66 is assembled to the lens-side housing 66 at the regular position, and in a normal state where no external force equal to or greater than a prescribed value acts on the lens holder 26 in the front-rear direction, the lens-side housing 66 is connected by a magnetic attraction strength owing to the magnetic attraction between the movable member-side magnet pieces 62 and the lens-side magnet pieces 78.

In this state, the lens holder 26 is connected to the movable member 44 in a driving relationship in the front-rear direction, so that when the drive arm 54 is rotated by the zooming motor 48 to cause the bending between the drive arm 54 and the connecting link 56 to approach a straight line, the movable member 44 moves forward. Conversely, when the bending between the drive arm 54 and the connecting link 56 deepens, the movable member 44 moves rearward. The lens holder 26 moves in the front-rear direction unitarily with the movable member 44 that moves in the front-rear direction; namely, the lens holder 26 undergoes zooming movement.

Also, in this state, because the lens-side magnet pieces 78 are located near the magnetic sensor 64, the magnetic sensor 64 detects magnetism equal to or greater than a prescribed value.

Because the movable member 44 and the lens holder 26 are connected to each other by the magnetic coupling between the movable member-side magnet pieces 62 and the lens-side magnet pieces 78, a large magnetic attraction force can be obtained without increasing the size of the movable member-side magnet pieces 62 and the lens-side magnet pieces 78, compared to a case where either the movable member-side magnet pieces 62 or the lens-side magnet pieces 78 consist of a ferromagnetic material such as a steel plate. Thereby, the strobe device 20 can be made compact.

When the lens holder 26 is pushed rearward or pulled forward strongly so that an external force equal to or greater than a prescribed value acts on the lens holder 26 in the front-rear direction, namely, when an external force greater than the magnetic attraction strength between the movable member-side magnet pieces 62 and the lens-side magnet pieces 78 acts on the lens holder 26, the magnetic attraction between the movable member-side magnet pieces 62 and the lens-side magnet pieces 78 is released, and the lens holder 26 is detached from the movable member 44 and becomes able to move freely in the front-rear direction relative to the strobe main body 24.

Thereby, even if a large external force acts on the lens holder 26, it is possible to prevent a large load from being applied to the connecting link 56, the drive arm 54, the speed reducer 50, and/or the zooming motor 48, whereby damage to them can be prevented.

In addition, in this state, the lens-side magnet pieces 78 are away from the magnetic sensor 64, the magnetic sensor 64 does not detect magnetism equal to or greater than the prescribed value.

Next, cooling of the light emitting part will be described.

As shown in FIG. 5, an electrically operated cooling fan unit 80 is provided at the rear of the lamp housing 34. As shown in FIGS. 1 to 4, external air intake holes 82 are formed on both left and right sides of the main body-side housing 30. As shown in FIG. 3, air discharge holes 83 are formed in an upper part of a front portion of the internal support 32.

The cooling fan unit 80 takes in external air through the external air intake holes 82 into the main body-side housing 30, and blows it to the lamp housing 34. Thereby, forced air cooling of the lamp housing 34, the xenon discharge tubes 36, and the reflecting mirrors 38 is performed. The external air blown to the lamp housing 34 flows from the air discharge holes 83 to the outside of the main body-side housing 30, and is discharged through a gap between the main body-side housing 30 and the lens-side housing 66 to the outside.

Figure 6:
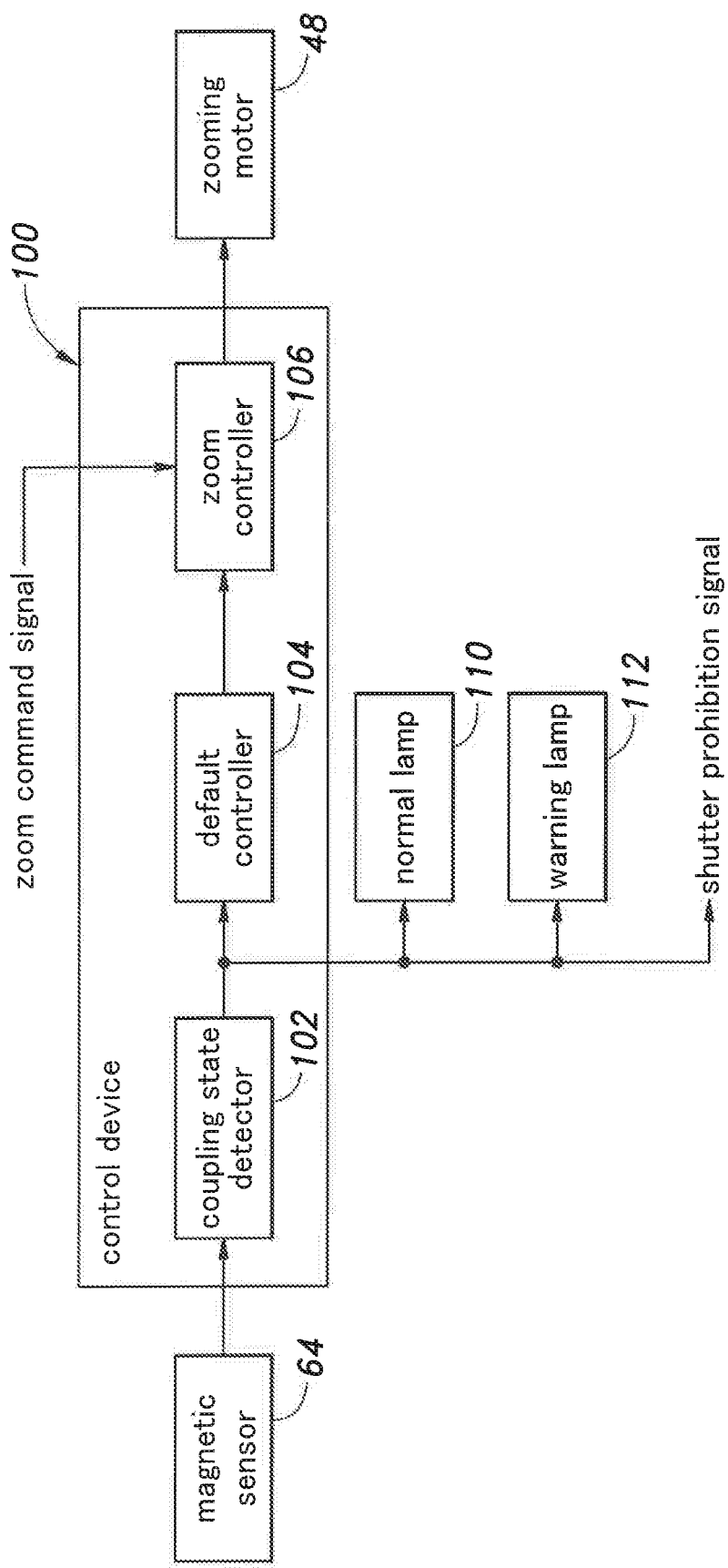
FIG. 6 is a block diagram of a zoom control system of the strobe device of the embodiment.

Next, a zoom control system will be described with reference to FIGS. 5 and 6.

The strobe device 20 includes a control device 100, which is embodied by a microcomputer, for example. The control device 100 includes a default controller 104 and a zoom controller 106. The zoom controller 106 receives a zoom command signal from outside, and controls driving of the zooming motor 48 based on the zoom command signal. The default controller 104 controls the driving of the zooming motor 48 to return the movable member 44 to a preset default position irrespective of the zoom command signal input from outside. The default position may be a position where the movable member 44 causes the lens-side housing 66 to move to the most receded position or the maximum wide illumination position.

The control device 100 includes a coupling state detector 102. The coupling state detector 102 receives a signal from the magnetic sensor 64, and if the magnetic sensor 64 detects magnetism equal to or greater than the prescribed value, determines that the movable member 44 and the lens holder 26 are properly coupled with each other by the magnetic force between the movable member-side magnet pieces 62 and the lens-side magnet pieces 78 (makes a "proper" determination), and if not, makes an "improper" determination.

When the coupling state detector 102 makes a "proper" determination, the control device 100 conducts a control to turn on the normal lamp 110, and when the coupling state detector 102 makes an "improper" determination, the control device conducts a control to turn on the abnormal lamp 112 and outputs an operation command to the default controller 104.

Thereby, when the movable member 44 and the lens holder 26 are properly coupled with each other by the magnetic force between the movable member-side magnet pieces 62 and the lens-side magnet pieces 78, the normal lamp 110 is turned on, and otherwise, the abnormal lamp 112 is turned on. Therefore, the user is allowed to accurately know whether the movable member 44 and the lens holder 26 are properly coupled with each other by the magnetic force between the movable member-side magnet pieces 62 and the lens-side magnet pieces 78, and avoid photographing with inappropriate strobe light.

Further, when the movable member 44 and the lens holder 26 are not correctly connected to each other by the magnetic force between the movable member-side magnet pieces 62 and the lens-side magnet pieces 78, the movable member 44 is returned to the preset default position. Thereby, initialization for remounting the lens holder 26 to the main body-side housing 30 can be performed properly. This also facilitates an operation of remounting the lens holder 26 to the main body-side housing 30. Particularly, in a case where the default position is the maximum wide illumination position, remounting of the lens holder 26 in an abutting manner, and the operation of remounting of the lens holder 26 is made easy.

Figure 7:
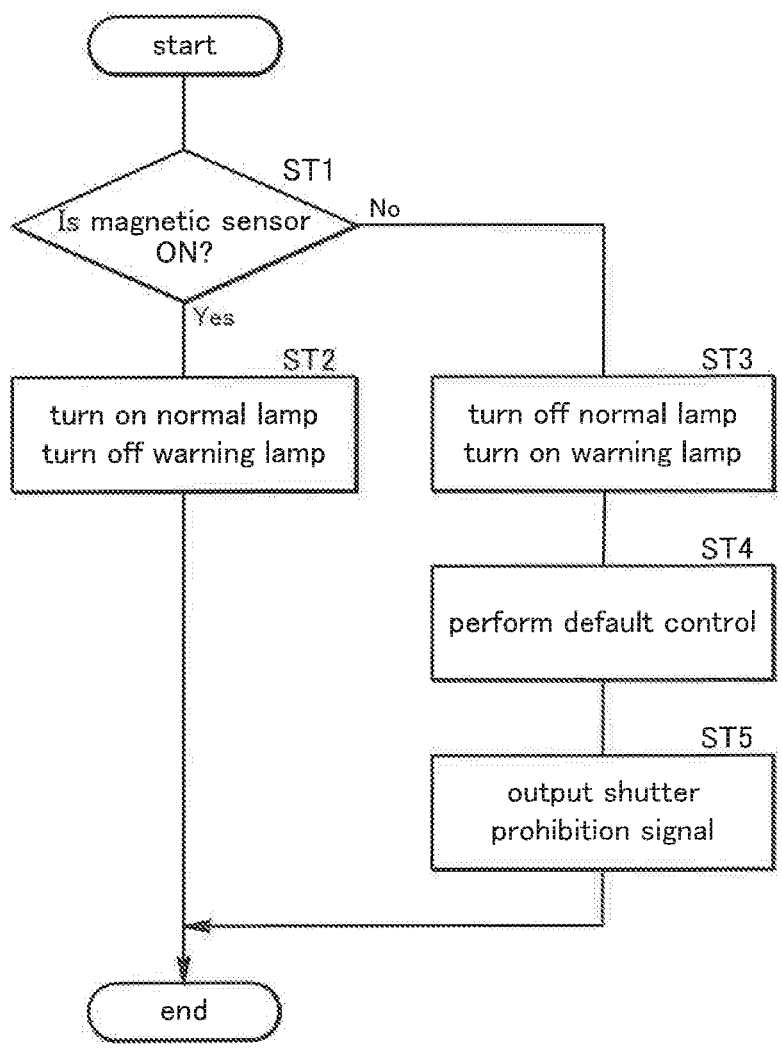
FIG. 7 is a flowchart of the zoom control system of the strobe device of the embodiment.

A control flow related to the magnetic sensor 64 is described with reference to FIG. 7.

This control flow may be performed by the control device 100 repeatedly at a prescribed interval. At first, a determination is made on whether the magnetic sensor 64 is on (ST1). If the magnetic sensor 64 is on, the movable member 44 and the lens holder 26 are properly coupled with each other by the magnetic force between the movable member-side magnet pieces 62 and the lens-side magnet pieces 78. In this case, the normal lamp 110 is turned on (lit on), and the abnormal lamp 112 is turned off (lit off) (ST2), and a single control flow is terminated.

If the magnetic sensor 64 is off, the movable member 44 and the lens holder 26 are not correctly connected to each other by the magnetic force between the movable member-side magnet pieces 62 and the lens-side magnet pieces 78. In this case, the abnormal lamp 112 is turned on (lit on), and the normal lamp 110 is turned off (lit oft) (ST3), and the default control is performed to return the movable member 44 to the preset default position (ST4). Then, a shutter prohibition signal is output (ST5), and a single control flow is terminated.

In the foregoing, the present invention has been described in terms of a preferred embodiment thereof. However, as will be readily appreciated by a person of ordinary skill in the art, the present invention is not limited to such an embodiment, and may be modified appropriately without departing from the scope of the present invention. For example, the movable member-side magnet pieces 62 may be mounted on left and right outer surfaces or the like of the movable member 44, and the lens-side magnet pieces 78 may be mounted on left and right inner surfaces or the like of the lens-side housing 66. In the illustrated embodiment, the movable member-side magnet pieces 62 and the lens-side magnet pieces 78 that magnetically attract each other are used, but either the movable member-side magnet pieces 62 or the lens-side magnet pieces 78 may consist of a ferromagnetic material such as a steel plate. The zoom drive is not limited to a lever type and may be of a feed screw type. Also, not all of the component parts shown in the foregoing embodiment are necessarily indispensable, and they may be selectively used as appropriate without departing from the scope of the present invention.

GLOSSARY

10 camera
12 screw
14 strobe bracket
16 fixture
20 strobe device
22 battery case
23 mounting portion
24 strobe main body
26 lens holder
30 main body-side housing
30A lower housing
30B upper housing
32 internal support
34 lamp housing
36 xenon discharge tube
38 reflecting mirror
40 protective glass
42 guide bar
44 movable member
44A bracket
46 engagement hole
47 zooming drive device
48 zooming motor (electric motor)
50 speed reducer
52 output shaft
54 drive arm
54A base end
54B free end
56 connecting link
56A one end
56B another end
58 connecting screw
60 connecting screw
62 movable member-side magnet piece
64 magnetic sensor (connecting state detector)
66 lens-side housing
68 Fresnel lens
70 lens part
72 engagement member
74 opening
76 groove
76A front end
76B rear end
78 lens-side magnet piece
80 cooling fan unit
82 external air intake hole
83 air discharge hole
100 controller
102 coupling state detector
104 default controller
106 zoom controller
110 normal lamp
112 abnormal lamp

The invention claimed is:

1. A strobe device comprising a strobe main body having a light emitting part, and a lens holder mounted on the strobe main body so as to be movable in a front-rear direction and having a lens on a front side thereof, characterized in that the strobe device comprises:
    a zooming drive device provided in the strobe main body and including a movable member driven by an electric motor in the front-rear direction; and
    a magnet piece(s) attached to at least one of the movable member and the lens holder to connect the movable member and the lens holder to each other by a magnetic force.

2. The strobe device as defined in claim 1, wherein the strobe main body includes a main body-side housing accommodating the light emitting part and the zooming drive device therein,
    the lens holder includes a lens-side housing engaging an outer circumference of the main body-side housing so as to be movable in the front-rear direction and supporting the lens, and
    the magnet piece(s) includes a movable member-side magnet piece provided on the movable member and located in the main body-side housing, the movable member-side magnet piece opposing a magnetic attraction part provided to the lens-side housing via the main body-side housing.

3. The strobe device as defined in claim 2, wherein the movable member-side magnet piece is provided on an outer circumferential surface of the movable member, and
the magnetic attraction part includes a lens-side magnet piece provided on an inner surface of the lens-side housing opposing the movable member-side magnet piece.

4. The strobe device as defined in claim 2, wherein the strobe main body includes a pair of left and right linear guide members each extending in the front-rear direction in the main body-side housing to guide movement of the movable member in the front-rear direction,
the movable member-side magnet piece includes two magnet pieces provided on left and right parts of the movable member respectively aligned with lateral positions of engagement portions at which the movable member engages the linear guide members.

5. The strobe device as defined in claim 1, wherein the zooming drive device includes a drive arm having a base end fixed to an output portion of the electric motor, and a connecting link having one end pivotably connected to a free end of the drive arm and another end pivotably connected to a laterally central part of the movable member.

6. The strobe device as defined in claim 1, further comprising:
a connecting state detector configured to detect whether the movable member and the lens holder are connected to each other by the magnetic force of the magnet piece(s) by detecting magnetism of the magnet piece(s); and
a warning device configured to make a warning when the connecting state detector detects that the movable member and the lens holder are not connected to each other.

7. The strobe device as defined in claim 1, further comprising:
a connecting state detector configured to detect whether the movable member and the lens holder are connected to each other by the magnetic force of the magnet piece(s) by detecting magnetism of the magnet piece(s); and
a default controller configured to control driving of the electric motor to move the movable member to a preset default position when the connecting state detector detects that the movable member and the lens holder are not connected to each other.

8. The strobe device as defined in claim 1, wherein the lens consists of a Fresnel lens made of plastic.

* * * * *